United States Patent Office 3,151,933
Patented Oct. 6, 1964

3,151,933
SOLVENT EXTRACTION PROCESS FOR THE RE-
COVERY OF VANADIUM FROM SOLUTIONS
Wayne C. Hazen and Angus V. Henrickson, Boulder,
Colo., assignors to Kerr-McGee Oil Industries, Inc., a
corporation of Delaware
No Drawing. Filed Sept. 19, 1956, Ser. No. 610,715
4 Claims. (Cl. 23—19)

This invention relates to the recovery of vanadium from ores and other source material. More particularly, it relates to the isolation of vanadium values from acid leach solutions, and the like, by solvent extraction.

One of the methods of the prior art used in ore treatment comprises obtaining solutions containing vanadium by leaching the ore with a mineral acid, preferably sulfuric acid. This method is applicable to vanadium ores specifically as well as to ores whose major constituent is not vanadium. For example, ores such as carnotite may be leached with a mineral acid. The uranium may be removed by a number of methods which are well known to the art, as for example, the recovery of uranium by the use of ion exchange materials. After the removal of the uranium by ion exchange, there remains an acid liquor containing varying amounts of materials such as iron and aluminum, together with desirable amounts of vanadium and possibly other metal values.

Recovery of vanadium values from such liquors has in the past been difficult and incomplete. Precipitation techniques have been employed with some degree of success, but recovery is not complete, and interferences arise from other constituents, such as iron and aluminum which may for example accompany the vanadium in the course of the recovery process to give a product of decreased value, or lead to the necessity for a multistage purification procedure to produce a marketable product.

Solvent extraction processes for the recovery of metal values from aqueous solutions have been developed in recent years, as for example the use of trialkyl phosphates carried in a suitable inert water immiscible solvent for the extraction of uranium, thorium, and the rare earths. These extractions have proved economically advantageous because of the high value of the recovered metals, and because of the unique chemical behavior of the elements, in that they form extractable species in aqueous solutions differing from associated impurities, as for example, iron, aluminum, and vanadium, which do not extract.

The extraction of less costly, but nevertheless desirable metal values, such as vanadium, has in general not proven economic as other costly chemicals are necessary to form an extractable chemical species. An example of these auxiliary chemicals needed in prior art extraction process is oxidizing agents to oxidize the normally occurring tetravalent vanadium to its pentavalent state and the addition of phosphate to make possible its extraction with solvents such as isopropyl ether.

Efforts have been made to utilize mono-alkyl and di-alkyl hydrogen phosphates such as octa-decyl di-hydrogen phosphate and di-octyl-hydrogen phosphate for the extraction of vanadium values from aqueous leach liquors. However, attendant difficulties arising from poor selectivity, undesirable side reactions, such as the formation of insoluble products with associated impurities, and the tendency to form unmanageable emulsions and the poor regeneration or rejuvenation characteristics of these extractants have severely limited these prior art methods, and have in general rendered them uneconomic.

It is therefore the object of this invention to provide an improved and novel method for the economic recovery of vanadium values from acidic leach liquors and the like, by the use of solvent extraction.

It is a further object of this invention to provide a novel process for the extraction of vanadium from acidic solutions which is free from undesirable side reactions and the consequent emulsion difficulties, and which is selective in respect to vanadium.

It is a further object of this invention to provide a solvent extraction method for the extraction of vanadium from acidic solutions wherein the extractant is effectively regenerated to approximately its original activity and capacity, and is thus suitable for continuous recycling.

These objects and other objects will become apparent to those skilled in the art by reference to the following detailed description.

We have discovered that vanadium, preferably in the tetravalent oxidation state, may be extracted from acidic aqueous solutions by adjusting the hydrogen ion concentration of the solution to a pH of 1.4 to approximately 3.0, contacting the adjusted solution with the hydrogen form of di-2-ethyl hexyl hydrogen phosphate in an inert, water immiscible solvent, separating the phases and recovering the vanadium by treatment with a strong acid. Further, we have discovered that operation of the system at an elevated temperature, preferably about 90–120° F. has a marked beneficial effect on the separation of phases, and reduces the tendency to form emulsions to a negligible degree. Still another unexpected and unique feature of the extraction process described herein is the discovery that by operating in the pH range of 1.4 to about 3.0, or preferably between pH 1.5 to 1.8, the extraction of undesirable elements such as iron and aluminum which are normally present in vanadium leach liquors can be prevented. The solvent activity and the capacity of di-2-ethyl hexyl hydrogen phosphate for vanadium is thereby maintained over extended periods of time, as well as providing a vanadium concentrate of exceptional purity.

In practicing the present invention, we prefer to first prepare a solution of a di-2-ethyl hexyl hydrogen phosphate in a water immiscible inert carrier. The source of di-2-ethyl hexyl phosphate may be any of the commercially available materials of this compound, as for example Tergitol P–28 which is an anionic wetting agent composed of a 25% solution of the sodium form of di-2-ethyl hexyl phosphate. This material may be converted to the hydrogen form by treatment with acid. The term "water immiscible inert carrier," as used hereinafter in the specification and claims, is understood to mean a suitable carrier having appreciable solubility for di-2-ethyl hexyl hydrogen phosphate, and which is substantially immiscible or insoluble in water, and substantially unreactive with acids or bases under the conditions taught in this invention. Examples of such inert carriers are hydrocarbons such as benzene, toluene, cyclohexane, hexane or octane, paraffinic or aromatic hydrocarbon distillates such as light or heavy naphthas, and chlorinated solvents such as carbon tetrachloride or perchloroethylene. The concentration of di-2-ethyl hexyl hydrogen phosphate in water immiscible inert carrier may vary over a considerable range. For example, the extraction solution may contain 1–30% by weight di-2-ethyl hexyl hydrogen phosphate with the remainder being water immiscible inert carrier. A phosphate in water immiscible inert carrier is preferred in most instances. The preferred inert carrier for economic reasons is kerosene or other suitable hydrocarbon distillates.

The acidic solution of vanadium is adjusted to a pH range of from 1.4 to 3.0, and in addition if significant amount of ferric iron is present in the solution, it is reduced to the ferrous state by any of the methods known to the art as, for example, contacting the solution with metallic iron.

The water immiscible extraction solution is brought into intimate contact with an acidic aqueous solution of vanadium, which may be a vanadium-bearing leach liquor, by any suitable means such as in a counter-current extraction unit and for such period of time as is necessary to effect extraction of the vanadium content. The pH of the acidic vanadium solution may vary from a pH greater than 1.4 but less than that pH at which various metal ions present in the solution are precipitated as hydroxides. A pH between 1.4 and 3.0 has been found to be very satisfactory, but even better results may be obtained when the pH is between 1.5 and 1.8. At a higher pH, i.e., about 2.5 and above, the di-2-ethyl hexyl phosphate tends to extract an appreciable amount of iron, aluminum, and other metals which may be present in vanadium leach liquors in addition to vanadium, and this tendency aggravates the problem of maintenance of solvent activity and capacity. When the preferred pH range is used, the amount of extraneous metals extracted by the di-2-ethyl hexyl phosphate are reduced to a point where problems such as maintenance of solvent activity and capacity and purity of recovered vanadium may be largely eliminated.

The above extraction step must be carried out at a temperature of at least 90° F. in instances where there is a pronounced tendency toward emulsion formation. However, the temperature should not be sufficiently elevated to cause a substantial amount of hydrolysis of di-2-ethyl hexyl phosphate. A preferred operating temperature for the extraction step is 90–120° F. as a temperature of 90° F. is sufficiently elevated to eliminate tendency toward emulsion formation and a temperature of 120° F. is not sufficiently elevated to cause substantial hydrolysis of di-2-ethyl hexyl phosphate. By carrying out the extraction step within the preferred temperature range, the tendency toward emulsion formation is eliminated and the amount of iron, aluminum and phosphate extracted along with the vanadium for leach liquors is also reduced. As above pointed out, these problems have heretofore prevented successful operation of many prior art solvent extraction processes.

After the extraction solution comprising di-2-ethyl hexyl hydrogen phosphate dissolved in a water immiscible inert solvent has been contacted with the acidic aqueous solution for a period of time sufficient to allow extraction of the vanadium content thereof, the vanadium loaded extractant is then separated from the aqueous acidic solution. The vanadium content of the vanadium loaded extractant is then recovered by stripping with a suitable stripping agent such as 10% sulfuric acid, for example. The stripped extractant is largely regenerated during the stripping step to its original activity and capacity and may be readily separated from the vanadium loaded stripping solution and recycled in the process. The volume of acid required for stripping the extractant, as is well understood in the art, will vary with the strength of the mineral acid solution. For example, if the acid strength is relatively high, then a very concentrated vanadium bearing stripping solution may be obtained and a smaller volume of acid solution is needed. However, if the acid strength is very low, then a less concentrated vanadium bearing stripping solution is obtained and a larger volume of acid solution is required. Preferably, phosphoric acid is used in conjunction with a suitable stripping agent for the purpose of preventing poisoning of the extractant.

A commercial grade of vanadium may then be readily obtained from the above mineral acid strip solution by various well known methods. One very satisfactory method comprises oxidizing the tetravalent vanadium content of the mineral acid strip material to pentavalent vanadium with an oxidizing agent such as chlorate, and then adjusting the acid strength to effect precipitation of pentavalent vanadium as the oxide $V_2O_5$. Other methods for obtaining vanadium from either acidic or basic concentrates are known and practiced in the art and the specific method employed therefore does not comprise a part of this invention.

It has been found that the process described herein will recover at least 94–95% of the vanadium content of aqueous acidic vanadium bearing solutions and under the preferred conditions of the invention the recovery is about 98% or higher. It is also possible to obtain this extremely high percentage recovery with relatively simple and inexpensive equipment and at low operating costs when compared with the conventional hydrometallurgical methods for the recovery of vanadium from similar solutions. A further important advantage of the invention is that under preferred conditions, i.e., operating at a temperature of 90–120° F. and at a pH of 1.5–1.8, the vanadium content of leach liquors may be recovered as high grade commercial vanadium concentrate, an outstanding achievement over most prior art processes.

The novel extraction process of the present invention may be further illustrated by the following specific example. This example is given by way of illustration and is not intended as a limitation of the invention which is to be limited only as set forth in the appended claims.

*Example*

A vanadium bearing leach liquor containing vanadium in the tetravalent oxidation state was prepared by conventional hydrometallurgical procedures from a vanadium bearing ore. The leach liquor was found to have the following analysis:

|  | G./l. |
|---|---|
| V (as $V_2O_5$) | 4.81 |
| Fe | 2.78 |
| P (as $P_2O_5$) | 0.151 |
| Al (as $Al_2O_3$) | 10 |
| Ti (as $TiO_2$) | 0.2 |
| Other metals | Traces |

The above vanadium bearing leach liquor was first treated with a conventional reducing agent for the purpose of reducing ferric ion to ferrous ion and then extracted in a countercurrent extraction unit with a kerosene solution containing 10–20% by weight of di-2-ethyl hexyl hydrogen phosphate. A total of 2,350 gallons of the leach liquor was charged to the countercurrent extraction unit over a period of 101 hours with the kerosene extraction solution comprising di-2-ethyl hexyl hydrogen phosphate flowing countercurrently to the leach liquor. The rate of feed of kerosene extraction solution was 1 part by volume to each part by volume of leach liquor fed to the unit and the temperature of the leach liquor and extraction solution was maintained within the preferred temperature range of 90–120° F.

After operation of the countercurrent extraction unit for the 101 hour period, the vanadium barren leach liquor from the extraction unit went to tailings and the vanadium loaded kerosene extraction solution was transferred to a stripping section for vanadium stripping. The vanadium content of the kerosene extraction solution was recovered in the stripping section by bringing the extractant into intimate contact with 10% sulfuric acid solution. The vanadium content of the vanadium loaded kerosene extraction solution was found to be concentrated in the sulfuric acid solution and the di-2-ethyl hydrogen hexyl phosphate content of the extraction solution was found to be largely restored to its original solvent activity and capacity for the absorption of vanadium.

A commercial grade of vanadium was prepared from the above sulfuric acid stripping solution by chlorate oxidation of the vanadium content thereof to pentavalent vanadium and then adjusting the acid strength to effect precipitation of vanadium as $V_2O_5$. The precipitate was then recovered and found to contain considerably above 86% $V_2O_5$, which is the commercial specification for a vanadium concentrate. The precipitate was also found to contain relatively small quantities of metals such as iron and aluminum, and insoluble phosphate.

The tailings from the countercurrent extraction unit were analyzed for vanadium to determine the efficiency of the vanadium extraction process. Results of this analysis indicated that at least 98% of the original vanadium content in the leach liquor was recovered.

What is claimed is:

1. A process for recovering vanadium values from acidic aqueous solution comprising the steps of solvent extracting a portion of an acidic aqueous solution containing tetravalent vanadium values and having a pH between 1.4 and 3.0 with an extractant comprising a solution of di-2-ethyl hexyl hydrogen phosphate in a substantially water immiscible organic liquid carrier, separating the resulting vanadium containing extractant from the solvent extracted aqueous solution, stripping the vanadium from the vanadium containing extractant with an aqueous sulfuric acid stripping agent, intimately contacting the extractant with phosphoric acid to reduce poisoning of the extractant, and recycling the stripped extractant to the solvent extracting step to solvent extract tetravalent vanadium values from an additional portion of the acidic aqueous solution.

2. The process of claim 1 wherein the temperature of the acidic aqueous solution during the extraction step is 90–120° F.

3. A process for recovering vanadium values from acidic aqueous solution comprising the steps of solvent extracting a portion of an acidic aqueous solution containing tetravalent vanadium values and having a pH of about 2 with an extractant comprising a solution of di-2-ethyl hexyl hydrogen phosphate in a substantially water immiscible inert organic liquid carrier, separating the resulting vanadium-containing extractant from the solvent extracted aqueous solution, stripping the vanadium-containing extractant with an aqueous sulfuric acid stripping agent, intimately contacting the extractant with phosphoric acid to reduce poisoning of the extractant, and recycling the stripped extractant to the solvent extracting step to solvent extract tetravalent vanadium values from an additional portion of the acidic aqueous solution.

4. The process of claim 3 wherein the temperature of the acidic aqueous solution during the extraction step is 90–120° F.

References Cited in the file of this patent

UNITED STATES PATENTS

| | | |
|---|---|---|
| 2,211,119 | Hixson | Aug. 13, 1940 |
| 2,564,241 | Warf | Aug. 14, 1951 |
| 2,770,522 | Bailes et al. | Nov. 13, 1956 |
| 2,860,031 | Grinstead | Nov. 11, 1958 |

OTHER REFERENCES

Bailes: U.S. Atomic Energy Comm. publication DOW–113, March 1, 1954, 37 pages (note especially pages 21, 33 and 34).

Bailes: U.S. Atomic Energy Comm. publication DOW–114, April 1, 1954, 36 pages (note especially pages 9, 21 and 22).

Bailes: U.S. Atomic Energy Comm. publication DOW–117, July 1, 1954, 54 pages (note especially pages 8, 17, 21 and 25).

Bailes: U.S. Atomic Energy Comm. publication DOW–120, July–August 1954 (not especially pages 7, 8 and 32).

Bailes: U.S. Atomic Energy Comm. publication DOW–115, May 1, 1954, 52 pages (note especially pages 19 and 26).

Ellis et al.: U.S. Atomic Energy Commission publication, DOW–131, July 29, 1955, 104 pages.

Heidt et al.: U.S. Atomic Energy Commission publication, RMO–2042, February 28, 1955, 124 pages (pages 24 and 25 specially pertinent).